No. 798,305. PATENTED AUG. 29, 1905.
J. W. SMITH.
PEANUT DIGGER AND STRIPPER.
APPLICATION FILED AUG. 31, 1904.
3 SHEETS—SHEET 3.
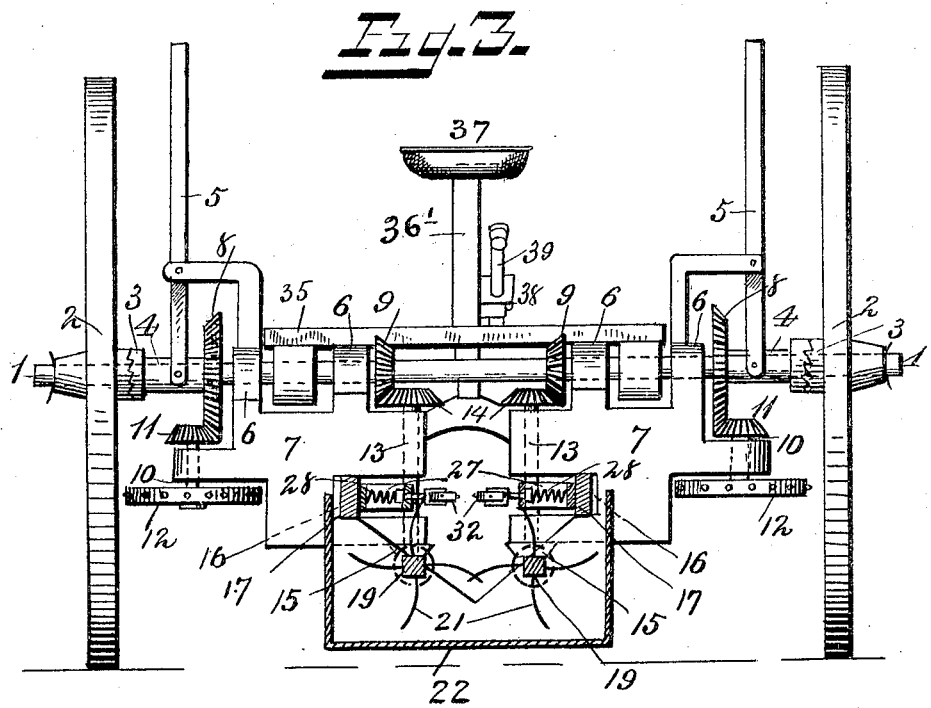
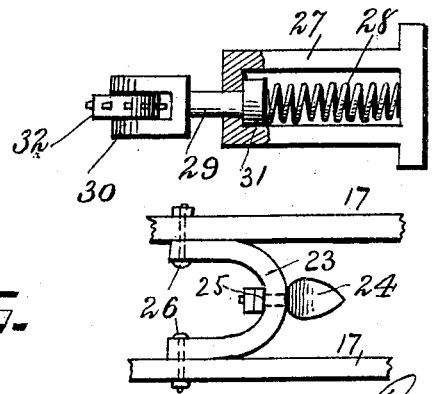
Witnesses
F. L. Ourand
John P. Duffie
Inventor
J. W. Smith
By John S. Duffie
Attorney

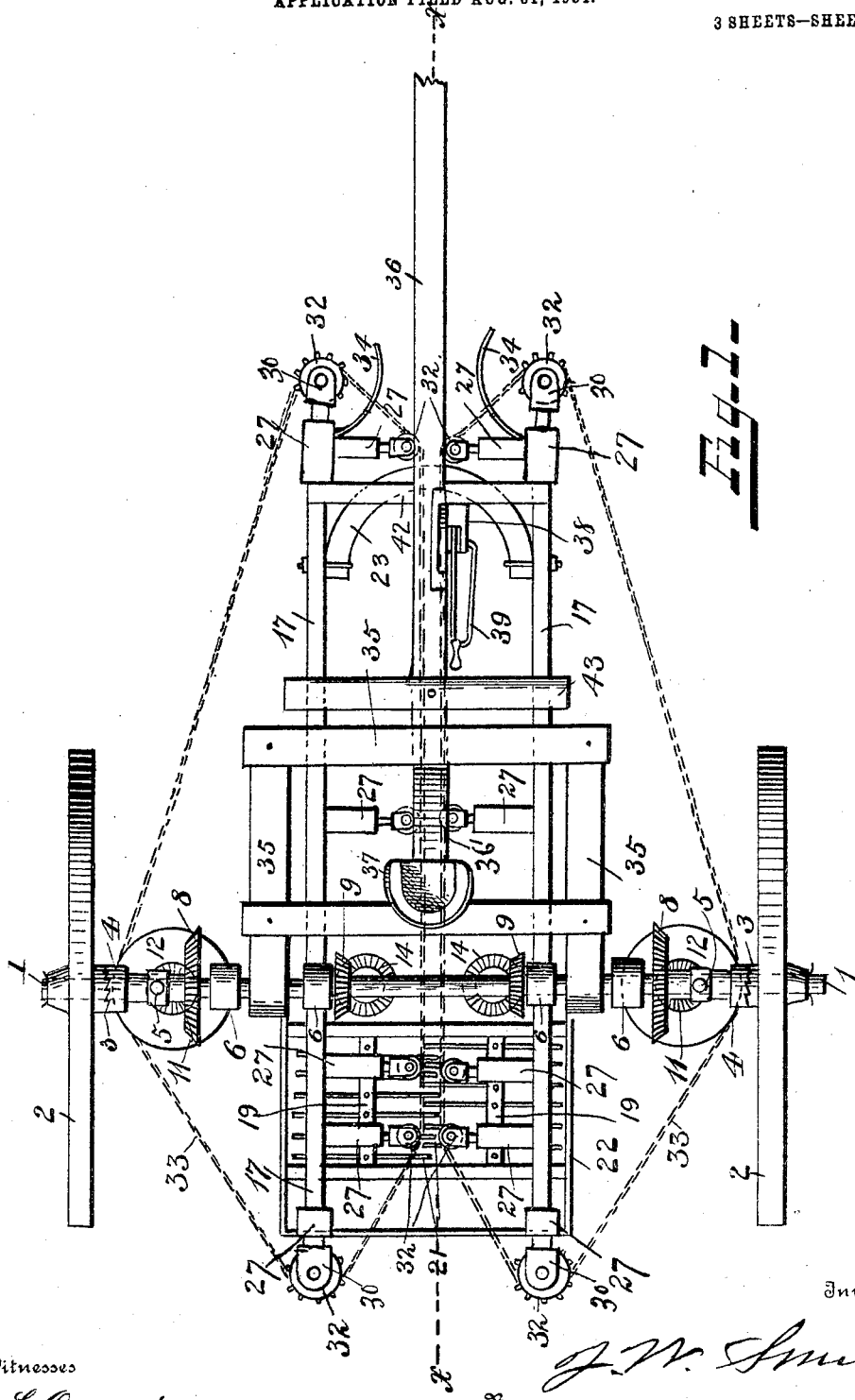

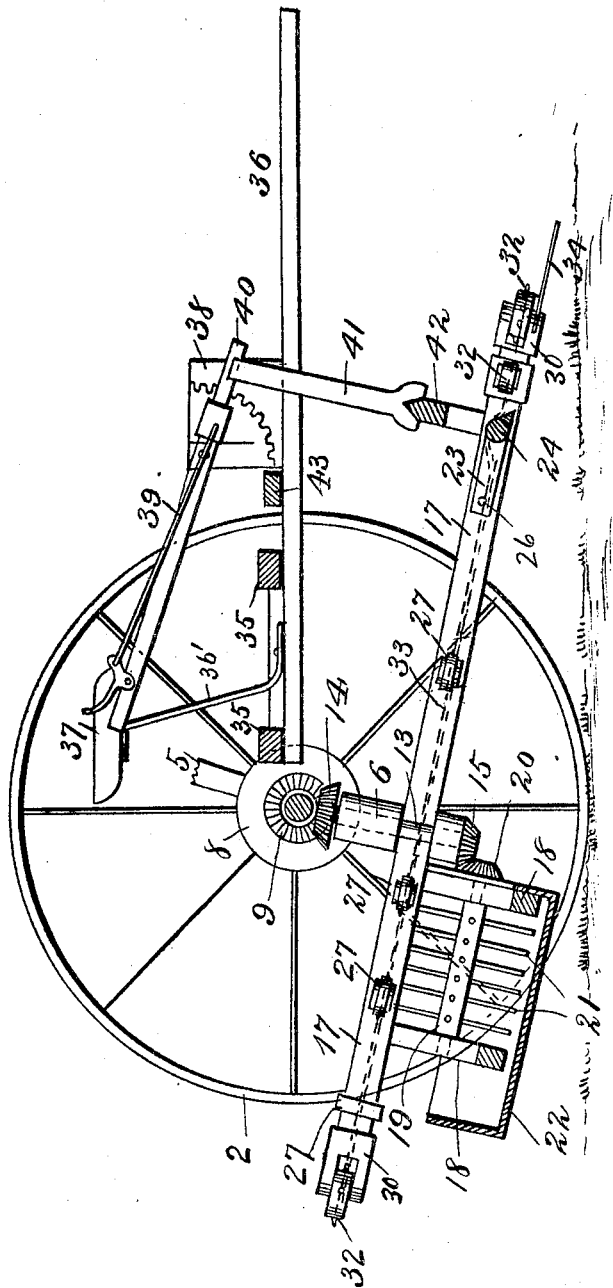

UNITED STATES PATENT OFFICE.

JOHN W. SMITH, OF CHILDERSBURG, ALABAMA.

PEANUT DIGGER AND STRIPPER.

No. 798,305.          Specification of Letters Patent.          Patented Aug. 29, 1905.

Application filed August 31, 1904. Serial No. 222,328.

*To all whom it may concern:*

Be it known that I, JOHN W. SMITH, a citizen of the United States, residing at Childersburg, in the county of Talladega and State of Alabama, have invented new and useful Improvements in Peanut Diggers and Strippers, of which the following is a specification.

My invention is a peanut digger and stripper—that is to say, it is so constructed and arranged that when drawn along the rows it will take the peanuts and vines, carry them to the rear of the machine, strip the peas from the vines, empty them into a box, and deposit the vines on the ground in the rear of the box.

In the accompanying drawings, Figure 1 is a top plan view of my invention. Fig. 2 is a longitudinal vertical sectional view on the line $x\ x$ of Fig. 1. Fig. 3 is a rear end elevation of my invention. Fig. 4 is a detail view showing one of the sprocket-wheels, the bearing of the sprocket-wheel mounted on a spring in a frame. Fig. 5 is a detail view showing the plow adjustably secured in a U-shaped holder, the holder adjustably secured between the side beams by bolts and nuts.

My invention is described as follows:

The numeral 1 represents the bearing-axle, 2 the drive-wheels, and 3 clutches which allow the wheels to turn backward without operating the machinery. 4 represents sliding clutch devices, one on each end of the axle, coming in contact with the clutch ends of the hubs of the wheels, and 5 represents levers by which said clutches may be operated, allowing the wheels to turn in either direction without operating the machinery. Depending from said axle 1 are clamps 6. Extending downwardly from said clamps 6, one on each side of the framework, are bearings 7. Rigidly secured to said axle are outer beveled gear-wheels 8 and inner beveled gear-wheels 9.

In the outer ends of the bearings 7 are journaled axles 10, on the upper ends of which are rigidly secured beveled gear-wheels 11, meshing with beveled gear-wheels 8, and on the lower ends of said axles 10 are rigidly secured sprocket-wheels 12. Journaled in the inner ends of said bearings 7 are axles 13. On the upper ends of said axles are rigidly secured beveled gear-wheels 14, meshing with said inner beveled gear-wheels 9, and rigidly secured on the lower ends of said axles are beveled gear-wheels 15, meshing with other gear-wheels, hereinafter mentioned.

Secured in recesses 16 in the inner faces of the bearings 7 are side beams 17. These side beams 17 extend rearwardly a short distance and have depending from them bearings 18. Journaled in said bearings are axles 19. Rigidly secured on the inner ends of said axles are beveled gear-wheels 20, which mesh with the other beveled gear-wheels 15, heretofore mentioned. Secured in said axles 19 are bent fingers 21, which gather the peanuts as said axles 19 revolve, strip them from the vines, and deposit them in a box 22, which is secured to the bearings 18. The said box 22 is so constructed that it will hold the peanuts. The rear part of the box may be hinged, so that it may be let down, and the bottom of the box may be open-work, so that the dirt which comes off of the peanuts may sift through. The fingers are long enough to pass between each other and are only close enough to grasp the peanuts and deposit them in the box. The said side beams 17 extend forward and incline downwardly and have adjustably secured between them, near their front ends, a U-shaped bearing 23, and in the U part of said bearing is adjustably secured a plow-point 24. This said plow-point may be set to go deep or shallow by a nut 25, working on its shank end, and may be set to point upwardly or downwardly by bolts and nuts 26, the bolts passing through the ends of said U-shaped bearing and the side beams. (See Fig. 5.) Secured on the front and rear ends and along the inner faces of said side beams are frames 27, which may be fully understood by an enlarged view, as shown in Fig. 4. Secured in each one of these frames 27 are spiral springs 28. Secured in the free end of each frame 27 and adapted to move back and forth is the neck 29 of a bearing 30. The head 31 of said neck rests against one end of said spiral spring 28. In each one of said bearings 30 is journaled a sprocket-wheel 32. Thus it will be seen that said sprocket-wheels have considerable play back and forth, the purpose of which is hereinafter mentioned. By reference to Fig. 1 it will be seen that I have numbered the sprocket-wheels 32 at each end of the side beams; but I did not number the intermediate wheels because I believed it would mar the face of the drawings.

Working around the sprocket-wheels 12 and 32 are sprocket-chains 33. As the drive-wheels go forward they carry the outer part of said sprocket-chains forward over the forward sprocket-wheels, then inwardly and backwardly over the sprocket-wheels that extend inwardly from front frames 27 on said side beams.

Extending inwardly and forwardly from the inner walls of the front frames 27 are two curved arms 34. These arms pick up the vines and conduct them between the sprocket chains, where they are grasped before the plow reaches their roots, and as the machine moves forward the plow-point 24, Fig. 5, turns the peanuts up out of the ground, the arms raising the vines, which are gathered in between the inner parts of the sprocket-wheels 32, extending inwardly from the side beams, and are carried back over the box 22, and the vines are carried rearwardly and dropped to the ground.

Hinged to the axle 1 and extending forward is a frame 35. Secured to said frame and extending forward is a tongue 36. Mounted on the upper face of said tongue and in front of said frame is a notched clutch-holder 38, and pivoted to the upper and rear part of said holder is a clutch device 39. Secured to the extreme forward end 40 of said clutch device is a rod 41, the lower end of which is secured to a cross-beam 42, the ends of which are secured to the upper faces of the side beams 17, and just in front of the frame 35 is swiveled a doubletree 43. A seat 37 is secured on a tongue 36 by means of a brace-rod 36'. The upper and free end of the clutch device 39 is within easy reach of the driver, so that he may, by means of said clutch device, raise or lower the front ends of the side beams 17 at will.

Having described my invention, what I claim as new, and desire to secure by Letters Patent, is—

1. The combination of a bearing-axle 1, provided with a series of beveled gear-wheels, a clutch device near each end, bearing-wheels on each end, and clutches adapted to turn the said axle forward, as said bearing-wheels move forward; clamps secured on said axle; bearings extending downwardly from said clamps; a longitudinal frame secured between the lower ends of said bearings; spring-mounted sprocket-wheels borne horizontally in the front and rear ends and along the inner faces of the side beams of said longitudinal frame; sprocket-wheels journaled horizontally to the rear ends of said bearings; axles, bearing-fingers, journaled under the rear end of said longitudinal frame; sprocket-chains passing around the first and last mentioned sprocket-wheels; a plow-point adapted to raise the peanuts and vines; guides extending from the front end of the machine and adapted to guide the peanuts and vines in between the moving sprocket-chains; a platform and tongue extending forwardly from said bearing-axle; a clutch-holder secured on the upper face of said tongue; a clutch-lever adapted to raise and lower the front end of said longitudinal frame; a box suspended under said fingers and adapted to catch the peanuts, and mechanism operated by said bearing-axle adapted to rotate the axles carrying said fingers and said last-mentioned sprocket-wheels, substantially as shown and described and for the purposes set forth.

2. A peanut digger and stripper, consisting of a longitudinal frame, having adjustably secured near its front end a plow-point, and in its front and rear ends and along the inner faces of the side beams of said frame, sprocket-wheels; bearings secured near the rear ends of said side beams, and extending downwardly; axles journaled in said bearings; fingers secured in said axles and adapted to pass between each other; a box suspended under said fingers; a bearing-axle secured crosswise above said longitudinal frame; bearing-wheels secured on each end of said axle; bearings secured near each end of said axle; sprocket-wheels journaled horizontally to the outer ends of said bearings; sprocket-chains passing around the last-mentioned and the first-mentioned sprocket-wheels, and over said fingers, and adapted to carry the peanuts and vines backwardly; curved arms extending from the forward ends of said side beams of said longitudinal frame, and adapted to guide the vines and peanuts between said sprocket-chains; said bearing-axle provided with gearings adapted to rotate the axles carrying said fingers; a platform and tongue extending forwardly from said bearing-axle, and a clutch-lever adapted to raise and lower the front end of said longitudinal frame, substantially as shown and described and for the purposes set forth.

In testimony whereof I affix my signature in presence of two subscribing witnesses.

JOHN W. SMITH.

Witnesses:
 JNO. A. NICHOLLS,
 EDGAR P. KIDD.